US012133514B2

(12) United States Patent
Beck et al.

(10) Patent No.: US 12,133,514 B2
(45) Date of Patent: Nov. 5, 2024

(54) SUBMERGED OBSERVATION UNIT FOR A FISH TANK

(71) Applicant: STINGRAY MARINE SOLUTIONS AS, Oslo (NO)

(72) Inventors: Esben Beck, Krackerøy (NO); Geir Inge Rødseth, Oslo (NO)

(73) Assignee: STINGRAY MARINE SOLUTIONS AS, Oslo (NO)

( * ) Notice: Subject to any disclaimer, the term of this patent is extended or adjusted under 35 U.S.C. 154(b) by 197 days.

(21) Appl. No.: 17/430,997

(22) PCT Filed: Feb. 11, 2020

(86) PCT No.: PCT/NO2020/050032
§ 371 (c)(1),
(2) Date: Aug. 13, 2021

(87) PCT Pub. No.: WO2020/167134
PCT Pub. Date: Aug. 20, 2020

(65) Prior Publication Data
US 2022/0408700 A1    Dec. 29, 2022

(30) Foreign Application Priority Data

Feb. 13, 2019 (NO) .................................. 20190203

(51) Int. Cl.
*A01K 61/10* (2017.01)
*A01K 61/60* (2017.01)
(52) U.S. Cl.
CPC .............. *A01K 61/60* (2017.01); *A01K 61/10* (2017.01)

(58) Field of Classification Search
CPC ........ A01K 61/00; A01K 61/10; A01K 61/60; A01K 61/95; B66D 1/28; B66D 1/60;
(Continued)

(56) References Cited

U.S. PATENT DOCUMENTS

2020/0107524 A1* 4/2020 Messana ................ A01K 61/10

FOREIGN PATENT DOCUMENTS

CN     1994848 A  *  7/2007  ............. B66C 13/06
CN   103501414 A  *  1/2014  ............. H04N 5/232
(Continued)

OTHER PUBLICATIONS

U.S. Appl. No. 62/742,145 (of U.S. 2020/0107524 A1 Messana et al.) filed Oct. 5, 2018 (disclosure and drawings provided).*
(Continued)

*Primary Examiner* — Peter M Poon
*Assistant Examiner* — Danielle A Clerkley
(74) *Attorney, Agent, or Firm* — Vorys, Sater, Seymour and Pease LLP; Khaled Shami

(57) ABSTRACT

The invention relates to a submerged observation unit (6) for a fish tank, wherein the observation unit (6) is suspended in a node cable (5) from a hoist winch (3) of a surface buoy (2). The node cable (5) is torsion-resistant, wherein the node cable (5) is at its upper end wound on the hoist winch (3) having a horizontal drum axis. The observation unit (6) is arranged to be motorized and to azimuthally rotate about a vertical axis. The surface buoy (2) is arranged to be motorized and to move along a main span (10) of a surface cable (1), wherein the main span (10) is arranged to be spanned across a float ring (9) of the fish tank.

13 Claims, 4 Drawing Sheets

Figure 1:
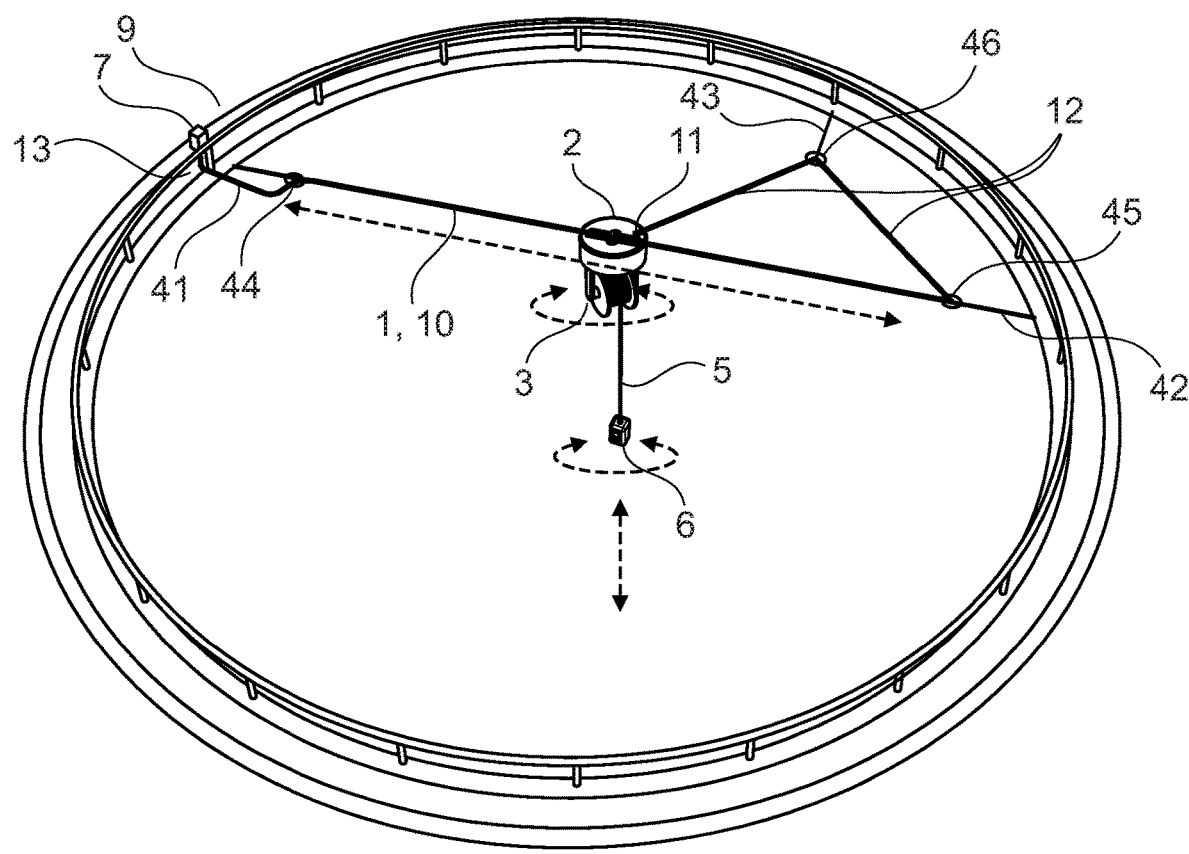

(58) Field of Classification Search
CPC ......... B66C 11/08; B66C 13/04; B66C 13/08; B66C 21/04
USPC .................................................. 119/215, 223
See application file for complete search history.

(56) References Cited

FOREIGN PATENT DOCUMENTS

| | | | |
|---|---|---|---|
| CN | 108040948 A | 5/2018 | |
| CN | 108059102 A | 5/2018 | |
| EP | 1871658 B1 | 8/2009 | |
| NO | 300401 B1 | 8/1995 | |
| NO | 330863 B1 | 8/2011 | |
| NO | 331345 B1 | 12/2011 | |
| NO | 337305 B1 | 12/2012 | |
| WO | 2010/015852 A2 | 2/2010 | |
| WO | 2012/030226 A1 | 3/2012 | |
| WO | WO-2013180665 A1 * | 12/2013 | ............... B66D 1/36 |
| WO | 2016063033 A1 | 4/2016 | |
| WO | WO-2017096424 A1 * | 6/2017 | ............. A01K 61/54 |
| WO | 2018117856 A1 | 6/2018 | |
| WO | 2020072438 A1 | 4/2020 | |

OTHER PUBLICATIONS

International Search Report, PCT No. PCT/NO2020/050032, Aug. 20, 2020. 5 Pages.
Written Opinion of the International Searching Authority, PCT No. PCT/NO2020/050032, Aug. 20, 2020. 8 Pages.
Chilean Search Report for corresponding application 202102150, 4 pages, 2022.

* cited by examiner

SUBMERGED OBSERVATION UNIT FOR A FISH TANK

INTRODUCTION

Invention relates to a submerged observation unit for a fish tank, wherein the suspended observation unit can be moved by a hoist winch on a surface buoy that, in turn, may move along a main span stretched across sea surface between two points on a float ring. More specifically, a node cable from the winch is torsion-resistant such that a rotation of the cable about its vertical axis, for instance due to rotation of the winch in the azimuthal plane, will control the observation unit to desired azimuth. By means of the possible indirect movement of the observation unit along the main span and the facts that the unit may be raised and lowered and that its azimuth may be controlled, it is achieved that the observation unit may be moved to all parts of the tank in a very flexible way and with simple equipment. The whole system is easy to mount, use and subsequently dismount for use in other tanks.

STATE OF THE ART

Many technical solutions for observing fish in a fish tank are known in the art. Several of these are described in the patent literature:

The applicant holds a Norwegian patent NO331345 "Device and Method for eliminating parasites on fish" for use in a fish tank. This is achieved by means of a camera that communicates with a control unit that communicates with a light source arranged to emit pulses, laser pulses, in order to damage the parasite. The control unit controls a system for optical recognition within a defined system of coordinates and is arranged to determine positions and in real time update coordinates of positions exhibiting difference in contrast typical for parasites located on fish skin, and to trigger a light pulse from a light source when the coordinates for a determined position coincide with the coordinates for the hit position of the light source on fish. In this way, salmon louse is killed or injured.

WO 2016/063033 A1 describes an aquaculture feeding apparatus comprising a feed supply attached to a float of variable buoyancy, and a flexible element connected between the variable buoyancy float and a mount structure, where the flexible element is arranged to hang in an arc between the variable buoyancy float and the mount structure. A feeding apparatus with adjustable buoyancy allows feed to be distributed to farmed aquatic animals at a variable depth within the water. The buoyancy of the float is adjusted so as to adjust the floating depth of said float while the distribution of weight of a flexible element connected in an arc between the float and a mount structure is changed.

NO300401 describes a positioning device for a camera, detector or measuring equipment in a fish tank. The equipment is suspended in two or more ropes that extend via upper periphery of the tank to a winch. The equipment is positioned using winches that work together and are mounted on a float ring.

NO330863 describes a device and a method for registering fish movement in a fish tank, wherein a camera housing is suspended on a cable that may be raised and lowered over water surface by means of a wire and a pulley and wherein a winch is provided on the edge of the tank.

NO337305 discloses a system and a method for calculating fish size. It discloses a winch for raising and lowering of the observation system into the tank. A rigid rod is suspended on a rope that extends from the railing of the tank to a buoy in the center of the tank.

CN108059102 describes an underwater winch with a sealed engine.

EP1871658B1, titled "Inspection system for underwater structures and having a positioning device", shows a device for positioning of an observation apparatus, wherein the apparatus may move up and down to different water depths by means of a continuous, adjustable vertical telescopic rod and move horizontally by means of a coupling between a track and a carriage guided by rolls. The observation unit may turn at least around the horizontal spatial axis (RM) and create a right angle with the optical camera axis (KA).

PROBLEMS WITH STATE OF THE ART

Above-mentioned disclosures do not solve the problems involving secure azimuthal arranging of the underwater observation equipment. NO300401 requires several winches and that they be controlled in a coordinated manner. NO330863 requires three azimuthally distributed cameras to observe in several directions around its vertical axis. This triples equipment and energy requirements and weight of the equipment, but also the total cost. NO337305 is intended to project a known striped pattern on fish passing by a camera in order to calculate fish size. Its disadvantage is poor control of the azimuth of the observation unit. In addition, there is a risk of undesirable motion of the submerged housing and ice build-up on the wire extending in the air.

BRIEF SUMMARY OF THE INVENTION

The invention, as defined in the main claim, is a submerged observation unit for a fish tank, wherein
- the observation unit is suspended in a node cable from a hoist winch in a surface buoy,
- the node cable is torsion-resistant,
- the node cable is at its upper end wound on the hoist winch having a horizontal drum axis,
- the observation unit is arranged to be motorized and to azimuthally rotate about a vertical axis,
- the surface buoy is arranged to be motorized and to move along a main span of a surface cable, wherein the main span is arranged to be stretched over a float ring of the fish tank.

Further beneficial features of the invention are defined in the dependent claims.

SHORT DESCRIPTION OF THE DRAWINGS

FIG. 1 is a perspective drawing of a fish tank having a float ring with railing and an observation unit suspended from a surface buoy that moves along a main span of a surface cable so that a chord stretched across the ring is created (chord as the tank is circular, or a line across a rectangle if the tank would be a rectangle). Second end of the surface cable is fixedly attached and goes back into the surface buoy provided with a winch. First end of the surface cable goes to a control pod on the tank edge.

Figure 2:
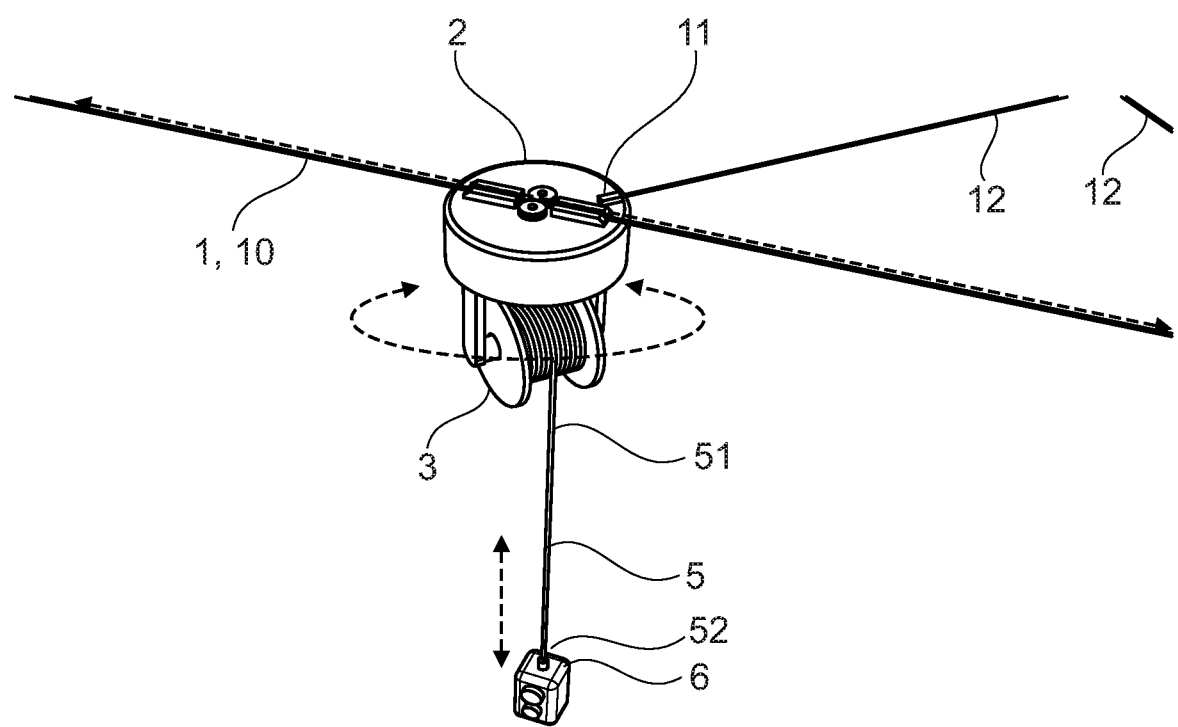

FIG. 2 illustrates a surface buoy provided with a winch and arranged to move along main span of the surface cable and with an observation unit being suspended in the torsion-resistant winch cable from a hoist winch. In this embodiment of the invention, the hoist winch may rotate around a vertical axis such that the torsion-resistant node cable controls the orientation, i.e. the azimuthal direction, of the observation unit.

Figure 3:
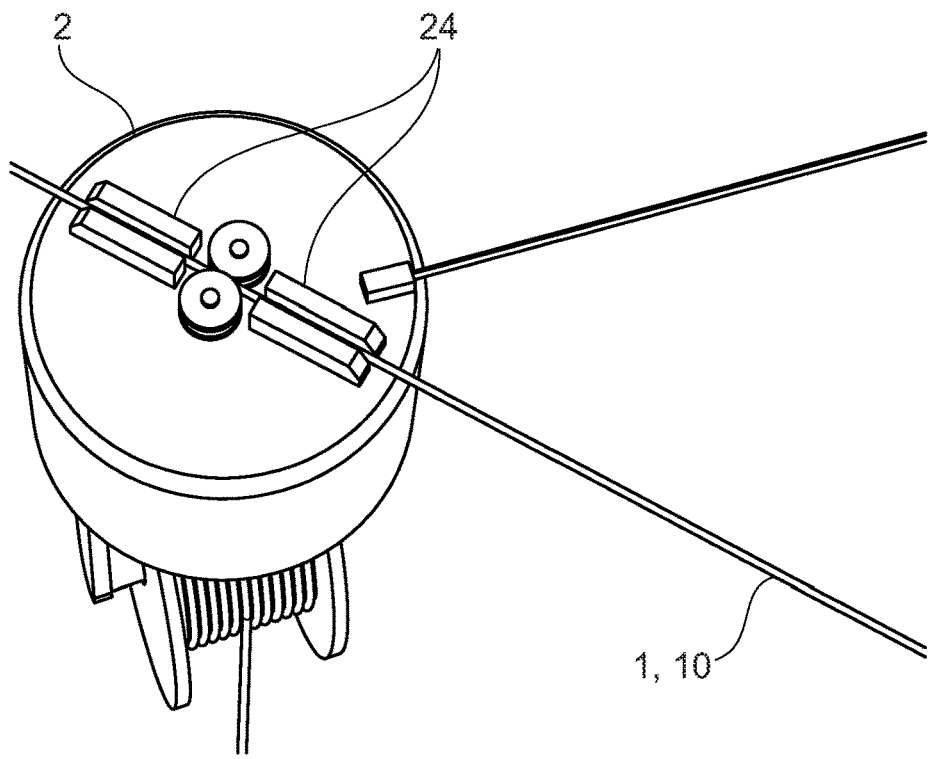

FIG. 3 illustrates a surface buoy 2 arranged to move along a surface cable 1. The one end of the surface cable goes back from a second or a third stag line attached to the tank ring, and into the buoy. The surface buoy is arranged to move along the main span of the surface cable. Drive wheels are closed and engage the main span so as to reposition the surface buoy to a desired position on the main span.

Figure 4:
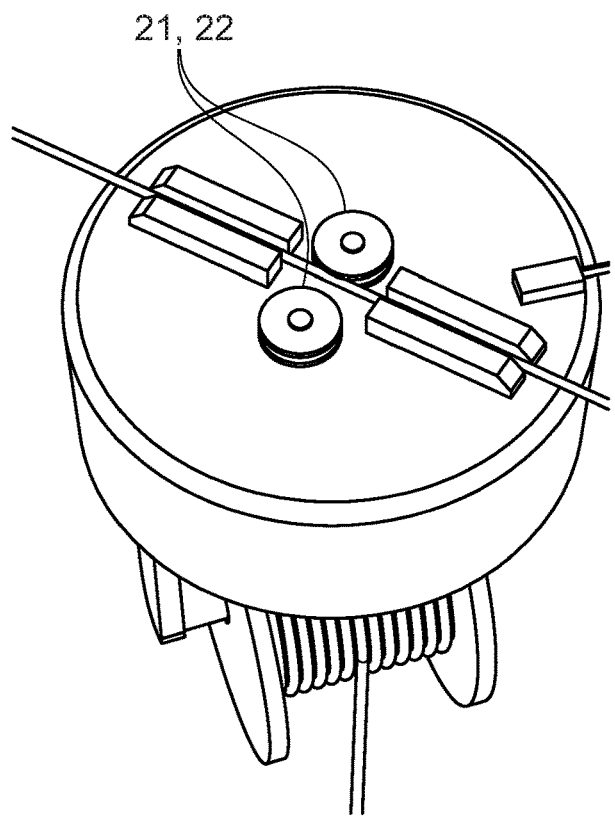

FIG. 4 illustrates a surface buoy on a surface cable, wherein drive wheels 21, 22 are open and do not engage the main span so that the wheels may be detached from the main span.

Figure 5:
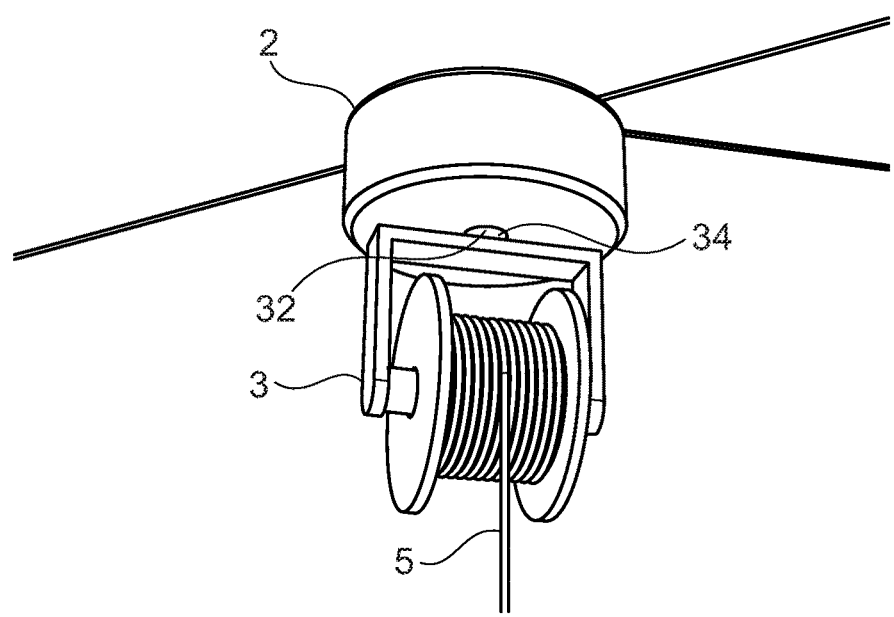

FIG. 5 illustrates a perspective drawing of a node cable 5 and a buoy 2 with a winch 3, seen from below. It is also shown a bearing 32 and a swivel device 34.

Figure 6:
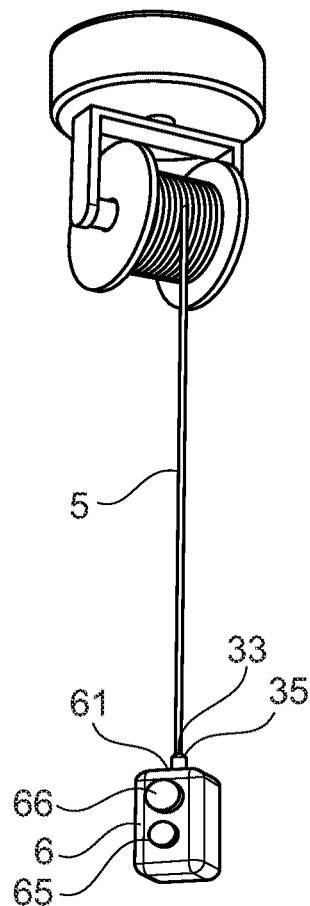

FIG. 6 illustrates, from the same perspective as that of FIG. 5, a buoy with a hoist winch, a node cable 5 and a suspended, azimuthally controllable observation unit 6. In analogy with FIG. 5, it is also shown a bearing 33 and a swivel device 35.

DESCRIPTION OF THE EMBODIMENTS OF THE INVENTION

FIG. 1 shows a submerged observation unit 6 for a fish tank, wherein
- the observation unit is suspended in a node cable 5 from a hoist winch 3 in a surface buoy 2,
- the node cable 5 is torsion-resistant,
- the node cable 5 is at its upper end wound on the hoist winch 3 having a horizontal drum axis,
- the observation unit 6 is arranged to be motorized and to azimuthally rotate about a vertical axis,
- the surface buoy 2 is arranged to be motorized and to move along a main span 10 of a surface cable 1, wherein the main span 10 is arranged to be stretched across a float ring 9 of the fish tank.

The surface cable 1 is so denoted since it is arranged to float or approximately float at sea surface in the tank 9. Accordingly, the cable experiences a weak buoyant force, or is neutral in water or is exposed to a weak, negatively-directed buoyant force. In FIGS. 1 and 2, it is shown an embodiment of the invention where a guide track 24 is provided so as to guide the main span 10 towards the drive wheels (shown in FIG. 4). In this way, the tensional forces on the surface cable 1 are advantageously small and the cable may be made rather flexible in order to simplify its management as well as attachment and securing of the surface cable in determined positions by means of shackles and stag lines.

A substantial advantage of the invention is that the surface buoy 2 and the cable 1 have limited exposure to ice building since they are positioned at sea surface and the surface buoy 2 is arranged so that it may be moved back and forth along the main span 10 of the surface cable 1 that doesn't extend through the air between the first and the second attachment points of the tank (float ring) 9. In the same context, the surface buoy 2 floats at the surface and it is mainly the longitudinal forces (and drift forces) that may be taken up by the attachments at each end of the tank 9. In consequence, the surface cable 1 (with zero or very small weight when in water) is only exposed to large tensional forces at the attachment points, the first and the second points in the ring 9.

One embodiment of the invention is shown in FIG. 1. An advantage of this embodiment, where the observation unit 6 is suspended in a torsion-resistant node cable 5 and wherein the motorized observation unit 6 is arranged to azimuthally rotate about a vertical axis, is that the observation unit 6 is suspended in the torsion-resistant node cable 5 with a stable and controllable azimuthal direction.

It is well-known to suspend an observation unit 6 in a cable that isn't torsion-resistant and provide the observation unit 6 with thrusters in order to rotate it in desired direction. This process is unstable, difficult to control, complex to set up and frequently results in an undesired swinging rotational movement about the vertical axis.

There are at least two different ways to make the observation unit 6 turnable about its vertical axis: up at the hoist winch 3 or down at the housing (shown in FIG. 6) of the observation unit 6. In one embodiment, the observation unit 6 is arranged to be motorized and to azimuthally rotate about a vertical axis and the hoist winch 3 is motorized and mounted on a bearing (shown in FIG. 5) with a vertical axis provided in the surface buoy 2 and a housing of the observation unit 6 is tightly sealed with respect to a lower end of the node cable 5. Accordingly, the entire hoist winch 3, including the torsion-resistant node cable 5 with the azimuthally affixed housing, rotates as a unit when the hoist winch 3 rotates azimuthally at the bearing and the observation unit 6 may observe in known and desired azimuthal direction, i.e. desired point of the compass. Other mechanisms and/or electronics in the housing 61 can control inclination of the observation unit 6 in the vertical plane. A substantial advantage of this embodiment is that the hoist winch 3 by itself is azimuthally rotatable and that the housing of the observation unit 6 is rigidly and sealingly mounted at lowermost section of the node cable 5. With reference to FIG. 2, a significant advantage this embodiment entails is a lower hydrostatic pressure at the surface. Moreover, it becomes easier to achieve efficient pressure sealing of the connection between an upper end 51 of the node cable 5 for current/signal transmission in a current/signal swivel device (shown in FIG. 5) against the upper end 51 of the node cable 5 wound on the drum of the winch 3 when compared with waterproof current/signal transmission in the lower end 52 of the node cable 5 at a bearing (shown in FIG. 6) with a signal/current swivel device (also shown in FIG. 6) in the housing. In the latter, the hydrostatic pressure is significantly higher than in the case near the surface which makes it more exposed to water.

In an alternative embodiment shown in FIG. 2, where the azimuthal mechanism is arranged low, the observation unit 6 is arranged to be motorized and to azimuthally rotate about a vertical axis and the hoist winch 3 is immobilized and the housing of the observation unit 6 is mounted on a bearing having a vertical axis at a lower end 52 of the node cable 5. There will then be provided an engine arranged to rotate the housing on the node cable 5, in addition to the waterproof swivel device of FIG. 6 with current/signal transmission in the lower end 51 of the node cable 5.

In one embodiment (shown in FIG. 1), the main span 10 of the surface cable 1 is stretched between a first and a second point on a float ring 9 by means of two elastic stag lines 41, 42. A first, elastic stag line 41 attached to the float ring 9 in the first point and provided with a first shackle 44 at a first end of the main span 10, and a second, elastic stag line 42 attached to the float ring 9 in the second point and provided with a second shackle 45 at a second end of the main span 10.

In one embodiment, the second shackle 45 is arranged to be movable along the surface cable 1 such that the length of the main span 10 may be adjusted to a desired length depending on whether the structure that the main span 10 spans across is circular or rectangular. The main span 10 of the surface cable 1 then stretches as a chord up to a diameter of a circular tank or as a desired line across a rectangular tank.

In one embodiment, a first end 13 of the surface cable 1 will extend beyond the first shackle 44 and be introduced into and connected in the control pod 7 of the tank ring 9, see FIG. 1.

Still with reference to FIGS. 1 and 2, in one embodiment, the surface cable 1 in addition to the main span 10 also comprises a continuous extension portion 12 at a cable end 11 extending beyond the second end of the main span 10 and the second shackle 45 and back into the surface buoy 2. A substantial benefit of this arrangement is that the surface buoy 2 moves along the main span 10 of the surface cable 1 and the supply of electrical energy, transmission of electrical signals and possible optical connection, all occur through the same cable.

In a system of this kind it is possible that the surface buoy 2 is fixedly attached to the second end 11 of the surface cable 1 and receives energy and signals via the same surface cable 1 from the control pod 7 while said buoy 2 moves along the same cable 1.

The length of the section of the surface cable 1 we denote "the first end" may be adjusted to a desired length between the control pod 7 and the first shackle 44 by an operator at the tank such that a suitable length constitutes the extension section 12 and the buoy 2 may freely move along the entire main span 10. Accordingly, the first and the second shackles 44, 45 are in one embodiment slideable along the surface cable 1 to delimit the main span 10 and arranged, once their position on the surface cable 1 is determined, to be secured.

In one embodiment, the continuous extension portion 12 is stretched to a third point on the float ring 9 between the first and the second point such that a third, elastic stag line 43 is attached to the float ring 9 in the first point and provided with a third shackle 46 at approximately midpoint of the extension portion 12, such that the entire surface cable 1 comprising the main span 10 and the extension portion 12 is stretched within the fish tank, see FIG. 1.

In this embodiment, a single surface cable 1 is required that is stretched within the tank: the same cable that stretches the chord constituting the main span 10 that the surface buoy 2 moves along, and the surface buoy 2 has galvanic and optical contact via second end 11 of the surface cable. In addition, battery operation or similar vulnerable solutions aren't required to ensure energy supply and optical or electrical signal transmission may be done from the surface buoy.

The presented observation unit 6 is easy to move to a different fish tank. There is no need to permanently mount equipment on the tank edges. Instead, the first, the second and the third stag lines 41-43 are attached to the tank edge in desired positions. The control pod 7 is kept on deck and the surface buoy 2 is launched, preferably by means of a crane, and engaged with the drive wheels 41, 42 on the main span 10. All forces from the surface cable 1 and the surface buoy 2 are transferred via shackles 44-46 that are elastically connected to the tank edge. This makes the equipment much easier to move between sites and it becomes possible to fine-tune buoy position in the tank only by means of shackles and stag lines. Moreover, the ice build-up doesn't pose any problems since most part of the surface buoy 2 is submerged. This is also true for the winch 3, node cable 5 and the observation unit 6, whereas the surface cable 1 is stretched along the sea surface.

In an embodiment of the invention, it is provided, from the other end 11 of the surface cable 1 and into the housing of the buoy 2, an energy and signal connection between the control pod 7 and the motorized wheels (shown in FIG. 4) so as to move the surface buoy 2 back and forth along the main span 10, and energy and signal connection for the motorization of the winch 3 and the motorized operation of the azimuthal control of the rotation of the hoist winch 3 about its vertical axis.

Accordingly and once again with reference to FIG. 1, the control pod 7, shown in FIG. 1, supplies the tank with energy and control signals via the surface cable 1 for following:
  moving the surface buoy 2 to a desired position along the main span 10 stretching along the sea surface of the tank,
  operating the hoist winch 3 so that it may raise and lower the observation unit 6 to a desired depth or winch it all the way up,
  rotating the observation unit 6 to a desired azimuthal direction,
  energy and control signals via the node cable 5 to operate the equipment and light sources in the observation unit 6,
  energy and control signals via the node cable 5 to orientate the equipment and light sources in the vertical plane.

With respect to FIGS. 3 and 4, in an embodiment, a surface buoy 2 comprises motorized drive wheels 21, 22 arranged to engage with the main span 10 of the surface cable 1 and wherein the drive wheels 21, 22 are arranged to move the surface buoy 2 along the main span 10 to a desired position on the main span 10. The drive wheels may be arranged as two drive belts that abut the main span 10. The grip of the drive wheels on the main span 10 stabilizes the azimuthal direction of the surface buoy to a certain degree, in particular since these are arranged as drive belts.

In an embodiment, at least one of the drive wheels 21, 22 is arranged to be movable with respect to the other drive wheel 21, 22 and to be detachable from the main span 10.

In an embodiment, the surface buoy 2 is provided with at least one guide track 24 (also shown in FIGS. 3 and 4) arranged to guide the main span 10 towards the drive wheels 21, 22 and to achieve directional stability of the surface buoy 2 with respect to the main span 10. In one embodiment, the guide track 24 extends across the top section of the surface buoy 2, preferably just above or at the sea surface. In the shown embodiment, the surface buoy is mainly cylindrical in vertical direction and has a rather flat top. The shown embodiment will largely avoid ice build-up in the guide track 24 and between the drive wheels 21, 22 since they will frequently be washed by waves and the surface buoy 2 may be made to move slowly along the main span 10 if ice build-up is imminent.

In an embodiment of FIG. 6, an observation unit 6 comprises at least one of the following optical units 65, 66 provided in or at the housing 61:
  a camera (not visible in FIG. 6) arranged to record images of fish,
  an ultrasonic probe 65 arranged to record images of fish or determine position of fish,
  a laser 66 arranged to perform at least one of the following:
    irradiate fish,
    detect and determine position of fish,
    detect and determine position of organisms on fish, and
    irradiate and kill organisms on fish,
  a light source (not visible in FIG. 6) arranged to light up fish, for instance a LED-source, hydrological measuring instruments (not visible in FIG. 6) such as a salinity gauge, an oxygen saturation gauge, acoustical sensors, biological sensors and so on.

In an embodiment, the at least one optical unit 65, 66 is controllable in the vertical plane and in the horizontal plane.

With such equipment installed in the observation unit 6 it is possible to control the observation unit to a desired position in the tank, and to a desired depth at this position, and to direct the sensors in desired direction so as to obtain full access to the entire volume of the tank from the obtained desired position.

The invention claimed is:

1. An observation system for a fish cage, said observation system comprising a submerged observation unit, a surface cable and a surface buoy comprising a hoist winch, wherein the observation unit is suspended from a node cable from the hoist winch of the surface buoy, wherein
the hoist winch is azimuthally rotatable about a vertical axis and the node cable is torsion-resistant,
the node cable is at its upper end wound on the hoist winch having a horizontal drum axis,
the observation unit is motorized and azimuthally rotatable with the hoist winch about a vertical axis, and
the surface buoy is motorized and movable along a main span of the surface cable, wherein the main span spans across a float ring of the fish cage.

2. An observation system for a fish cage according to claim 1, wherein hoist winch is motorized and mounted on a bearing with a vertical axis provided in the surface buoy and wherein a housing of the observation unit is tightly sealed at a lower end of the node cable.

3. An observation system for a fish cage according to claim 1, wherein the hoist winch is immobilized and a housing of the observation unit is mounted on a bearing having a vertical axis at a lower end of the node cable.

4. An observation system for a fish cage according to claim 1, wherein the main span of the surface cable is stretched between a first and a second point on the float ring by means of
a first, elastic stag line attached to the float ring in the first point and provided with a first shackle at a first end of the main span, and
a second, elastic stag line attached to the float ring in the second point and provided with a second shackle at a second end of the main span.

5. An observation system for a fish cage according to claim 4, wherein the surface cable in addition to the main span also comprises a continuous extension portion at a surface cable end extending beyond a second end of the main span and the second shackle and back to and into the surface buoy.

6. An observation system for a fish cage according to claim 5, wherein the continuous extension portion is stretched to a third point on the float ring between the first and the second point such that
a third, elastic stag line is attached to the float ring in the first point and provided with a third shackle at approximately midpoint of the extension portion, such that the entire surface cable comprising the main span and the extension portion is stretched within the fish tank.

7. An observation system for a fish cage according to claim 1, wherein the surface buoy comprises a set of motorized drive wheels that are engageable with the main span of the surface cable for moving the surface buoy along the main span to a desired position on the main span.

8. An observation system for a fish cage according to claim 7, wherein at least one of the drive wheels is movable with respect to the other drive wheel and detachable from the main span.

9. An observation system for a fish cage according to claim 7, wherein the surface buoy is provided with at least one guide track which guides the main span towards the drive wheels to achieve directional stability of the surface buoy with respect to the main span.

10. An observation system for a fish cage according to claim 1, wherein the observation unit comprises at least one of the following optical units provided in or at the housing:
a camera for recording images of fish,
an ultrasonic probe for recording images of fish or determining position of fish,
a laser for performing at least one of the following:
detecting and determining position of fish, and
detecting and determining position of organisms on fish, and
hydrologically measuring instruments.

11. An observation system for a fish cage according to claim 10, wherein the at least one optical unit is controllable in the vertical plane and in the horizontal plane.

12. An observation system for a fish cage according to claim 1, wherein there is a signal swivel or an electrical swivel or a signal and electrical swivel between a second end of the surface cable and an upper end of the node cable for signal transmission or current transmission or signal and current transmission in a signal/electrical swivel in the hoist winch.

13. An observation system for a fish cage according to claim 8, wherein the surface buoy is provided with at least one guide track which guides the main span towards the drive wheels to achieve directional stability of the surface buoy with respect to the main span.

* * * * *